US012720455B2

(12) United States Patent
Tang et al.

(10) Patent No.: US 12,720,455 B2
(45) Date of Patent: Aug. 25, 2026

(54) CLOCK CALIBRATION USING SINE WAVES

(71) Applicant: QUALCOMM Incorporated, San Diego, CA (US)

(72) Inventors: Yiwu Tang, San Diego, CA (US); Zhifei Fan, San Diego, CA (US); Chengjin Zhang, San Diego, CA (US); Yue Chao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 18/669,012

(22) Filed: May 20, 2024

(65) Prior Publication Data

US 2025/0358755 A1 Nov. 20, 2025

(51) Int. Cl.

*H04W 56/00* (2009.01)
*G16Y 40/30* (2020.01)
*G16Y 10/75* (2020.01)

(52) U.S. Cl.

CPC ......... *H04W 56/0035* (2013.01); *G16Y 40/30* (2020.01); *G16Y 10/75* (2020.01)

(58) Field of Classification Search

CPC ................................................ H04W 56/0035

See application file for complete search history.

(56) References Cited

U.S. PATENT DOCUMENTS

| | | | | |
|---|---|---|---|---|
| 6,542,754 | B1 * | 4/2003 | Sayers | H04W 56/0015 455/507 |
| 11,853,826 | B1 | 12/2023 | Hyde et al. | |
| 11,917,569 | B2 * | 2/2024 | Fabrega | H03L 7/099 |
| 2008/0039023 | A1 | 2/2008 | Ward | |
| 2012/0319822 | A1 * | 12/2012 | Hansen | G06K 7/10475 340/10.1 |
| 2025/0159623 | A1 * | 5/2025 | Li | H04N 21/43637 |

OTHER PUBLICATIONS

W. Van Moer and Y. Rolain, "Multisine Calibration for Large-Signal Broadband Measurements," in IEEE Transactions on Instrumentation and Measurement, vol. 57, No. 7, pp. 1478-1483, Jul. 2008 (Year: 2008).*

International Search Report and Written Opinion—PCT/US2025/024055—ISA/EPO—Jul. 25, 2025.

* cited by examiner

*Primary Examiner* — Jason D Recek

(74) *Attorney, Agent, or Firm* — Harrity & Harrity, LLP

(57) ABSTRACT

Various aspects of the present disclosure generally relate to wireless communication. Some aspects more specifically relate to using one or more clock synchronization signals comprising sine waves to calibrate a local clock at an ambient internet of things (IoT) device. In some aspects, the ambient IoT device may receive a mixed signal comprising a pair of dual-tone sine waves and calibrate the local clock using a difference in frequencies of the pair of dual-tone sine waves.

20 Claims, 10 Drawing Sheets

400

500A

500B

CLOCK CALIBRATION USING SINE WAVES

FIELD OF THE DISCLOSURE

Aspects of the present disclosure generally relate to wireless communication and specifically relate to techniques, apparatuses, and methods associated with clock calibration using sine waves.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

An ambient IoT device may be equipped with one or more low-power oscillators that maintain a frequency of a local clock of the ambient IoT device. However, the oscillator(s) may exhibit inaccuracies, such as frequency errors, jitter, or drift, among other examples. An inaccurate local clock may lead to discrepancies between the frequency of the local clock and a frequency of a clock at a reader. For example, lack of sufficient clock synchronization between the clocks may prevent the ambient IoT device from accurately identifying symbol boundaries in reader-to-device communications. However, the local clock is subject to a tradeoff between accuracy and power consumption: the more accurate the local clock, the greater the power consumption and associated cost of the local clock. Thus, improving the accuracy of the local clock to satisfy such clock synchronization requirements can result in excessive power consumption.

SUMMARY

Some aspects described herein relate to an apparatus for wireless communication at an ambient internet of things (IoT) device. The apparatus may include one or more memories storing processor-executable code and one or more processors coupled with the one or more memories. At least one processor of the one or more processors may be configured to cause the ambient IoT device to receive a mixed signal comprising multiple sine waves including a first sine wave having a first frequency and a second sine wave having a second frequency, the mixed signal comprising a reader-to-tag clock synchronization signal. At least one processor of the one or more processors may be configured to cause the ambient IoT device to calibrate a clock that comprises a local oscillator of the ambient IoT device using a difference between the first frequency and the second frequency.

Some aspects described herein relate to a method of wireless communication performed at an ambient IoT device. The method may include receiving a mixed signal comprising multiple sine waves including a first sine wave having a first frequency and a second sine wave having a second frequency, the mixed signal comprising a reader-to-tag clock synchronization signal. The method may include calibrating a clock that comprises a local oscillator of the ambient IoT device using a difference between the first frequency and the second frequency.

Some aspects described herein relate to an apparatus for wireless communication. The apparatus may include means for receiving a mixed signal comprising multiple sine waves including a first sine wave having a first frequency and a second sine wave having a second frequency, the mixed signal comprising a reader-to-tag clock synchronization signal. The apparatus may include means for calibrating a clock that comprises a local oscillator of the apparatus using a difference between the first frequency and the second frequency.

Some aspects described herein relate to a non-transitory computer-readable medium storing a set of instructions for wireless communication. The set of instructions may include one or more instructions that, when executed at an ambient IoT device, cause the ambient IoT device to receive a mixed signal comprising multiple sine waves including a first sine wave having a first frequency and a second sine wave having a second frequency, the mixed signal comprising a reader-to-tag clock synchronization signal. The set of instructions may include one or more instructions that, when executed at the ambient IoT device, cause the ambient IoT device to calibrate a clock that comprises a local oscillator of the ambient IoT device using a difference between the first frequency and the second frequency.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
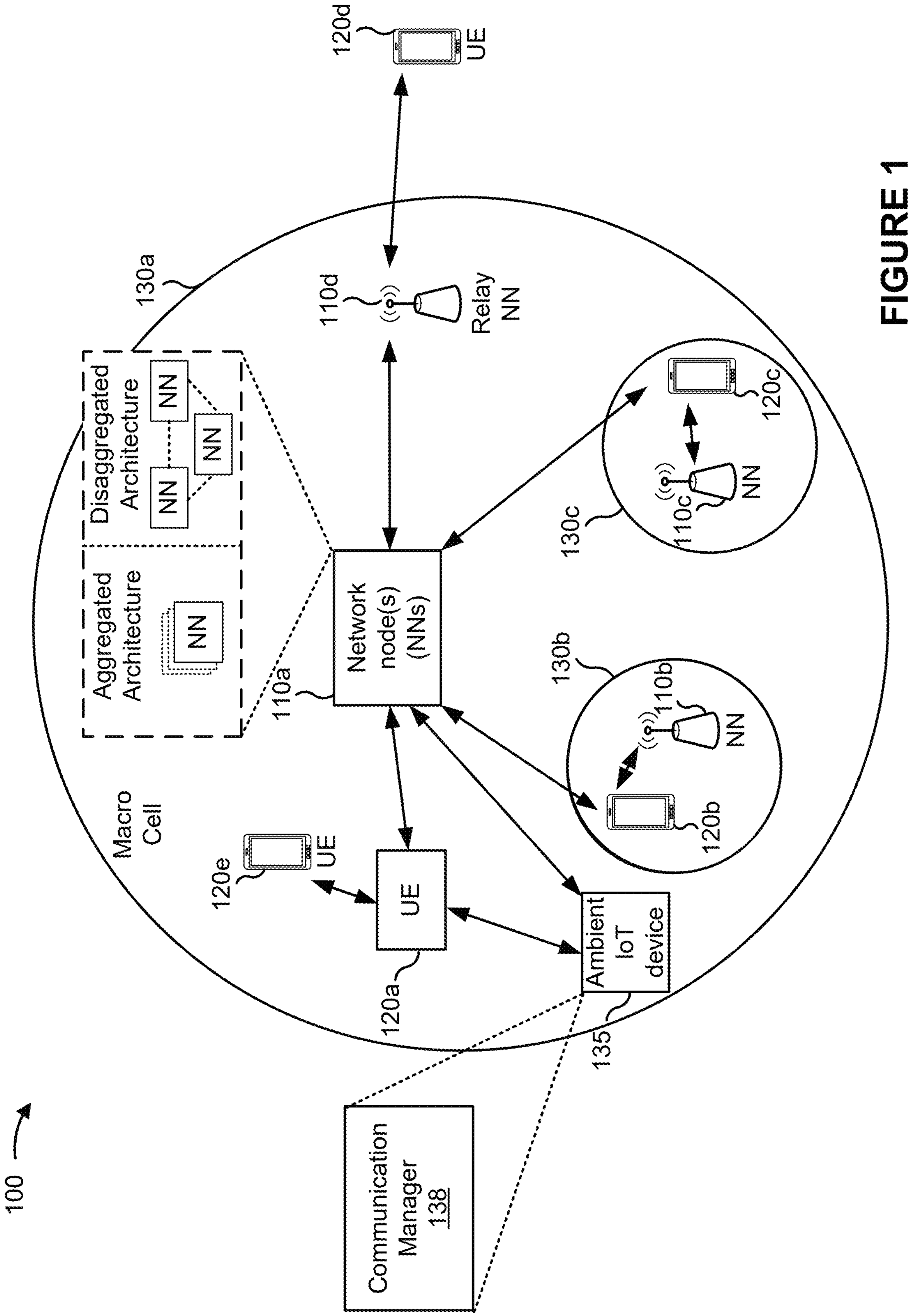
FIG. 1 is a diagram illustrating an example of a wireless communication network.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Some ambient internet of things (IoT) devices are designed to operate without a battery, relying on energy harvesting for power. An ambient IoT device may be equipped with one or more oscillators (for example, instead of a crystal) that maintain a frequency of a local clock of the ambient IoT device. The oscillator(s) may consume less power than a crystal; however, the oscillator(s) may exhibit inaccuracies, such as frequency errors, jitter, or drift, among other examples. The extent of these inaccuracies can depend on the specific type of oscillator that is used by the ambient IoT device.

An inaccurate local clock may lead to discrepancies between the frequency of the local clock and a frequency of a remote clock (for example, a clock at a reader). For example, lack of sufficient clock synchronization may prevent the ambient IoT device from accurately identifying symbol boundaries in reader-to-device (for example, reader-to-ambient-IoT-device) communications. However, the local clock is subject to a tradeoff between accuracy and power consumption: the more accurate the local clock, the greater the power consumption and associated cost of the local clock. As a result, improving the accuracy of the local clock to satisfy such clock synchronization requirements can result in excessive power consumption.

Various aspects relate generally to clock calibration using sine waves. Some aspects more specifically relate to using one or more clock synchronization signals comprising sine waves to calibrate a local clock at an ambient IoT device. In some aspects, the ambient IoT device may receive a mixed signal comprising a pair of dual-tone sine waves and calibrate the local clock using a difference in frequencies of the pair of dual-tone sine waves. "Dual-tone sine waves" refers two sine waves having respective frequencies (or "tones").

In some aspects, the ambient IoT device may calibrate the local clock using a difference in frequencies of at least one additional pair of dual-tone sine waves. In some further aspects, the ambient IoT device may receive the pairs of dual-tone sine waves at different times.

Particular aspects of the subject matter described in this disclosure can be implemented to realize one or more of the following potential advantages. In some examples, by calibrating the local clock using the difference in frequencies of the pair of dual-tone sine waves, the described techniques can be used to enhance clock synchronization and communication reliability in wireless systems without consuming excessive power. For example, using the multiple sine waves may offer enhanced reliability while enabling the ambient IoT device to use low-power techniques, such as envelope detection or low-pass filtering, for performing the clock synchronization.

In some examples, by calibrating the clock using a difference in frequencies of at least one additional pair of dual-tone sine waves, the described techniques can be used to enhance resilience to deep fading (for example, signal attenuation). In some further examples, by receiving the pairs of dual-tone sine waves at different times, the described techniques can be used to further enhance resilience to deep fading.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, IoT connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) user equipment (UE) functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or acrial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*c*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHZ), FR2 (24.25 GHz through 52.6 GHZ), FR3 (7.125 GHz through 24.25 GHZ), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

In some examples, two or more UEs 120 (for example, shown as UE 120*a* and UE 120*c*) may communicate directly with one another using sidelink communications (for example, without communicating by way of a network node 110 as an intermediary). As an example, the UE 120*a* may directly transmit data, control information, or other signaling as a sidelink communication to the UE 120*c*. This is in contrast to, for example, the UE 120*a* first transmitting data in an UL communication to a network node 110, which then transmits the data to the UE 120*c* in a DL communication.

In some aspects, the ambient IoT device 135 may include a communication manager 138. As described in more detail elsewhere herein, the communication manager 138 may receive a mixed signal comprising multiple sine waves including a first sine wave having a first frequency and a second sine wave having a second frequency, the mixed signal comprising a reader-to-tag clock synchronization signal; and calibrate a clock that comprises a local oscillator of the ambient IoT device 135 using a difference between the first frequency and the second frequency. Additionally or alternatively, the communication manager 138 may perform one or more other operations described herein.

Figure 2:
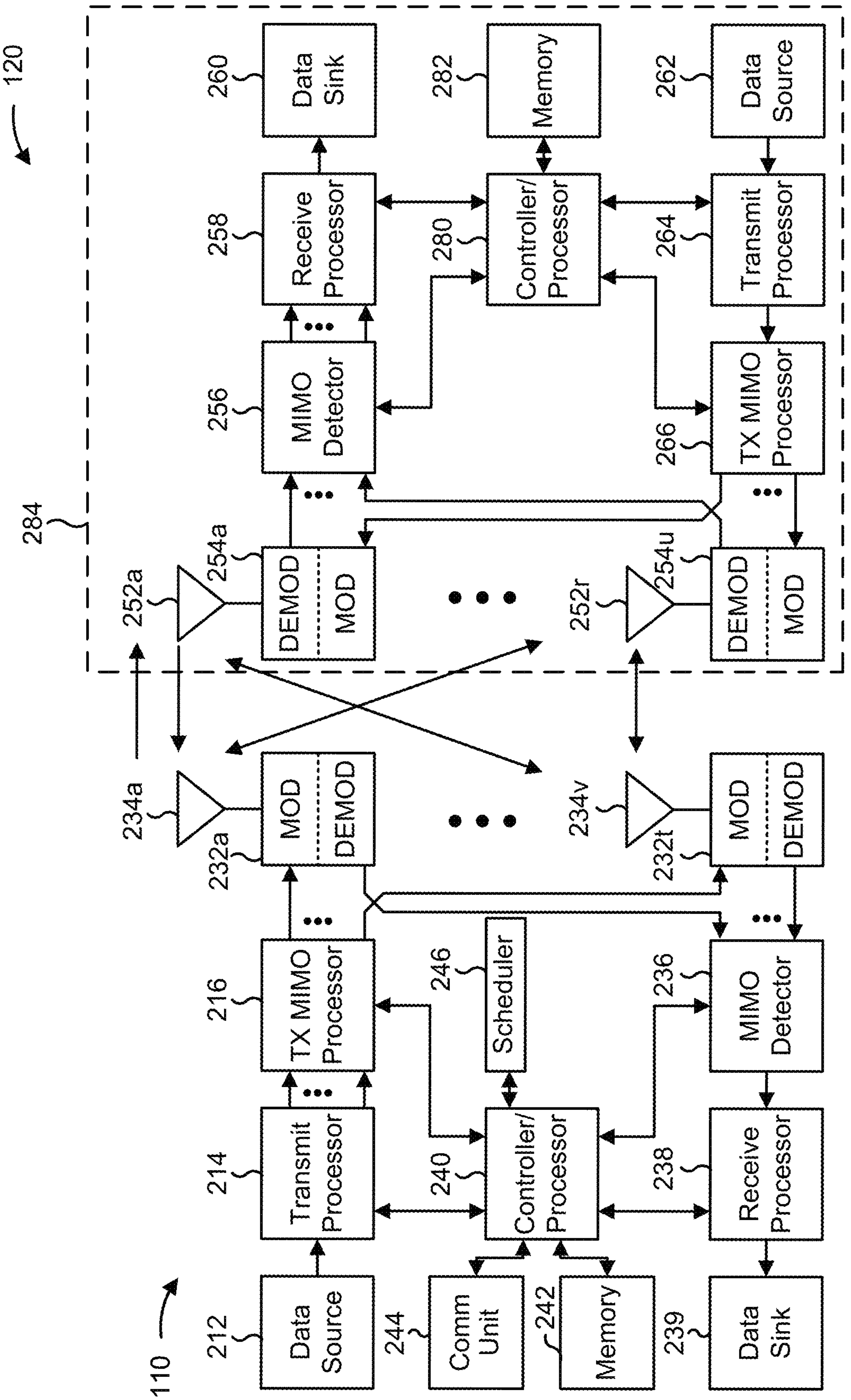
FIG. 2 is a diagram illustrating an example network node in communication with an example user equipment (UE) in a wireless network.

FIG. 2 is a diagram illustrating an example network node 110 in communication with an example UE 120 in a wireless network.

As shown in FIG. 2, the network node 110 may include a data source 212, a transmit processor 214, a transmit (TX) MIMO processor 216, a set of modems 232 (shown as 232*a* through 232*t*, where $t \geq 1$), a set of antennas 234 (shown as 234*a* through 234*v*, where $v \geq 1$), a MIMO detector 236, a receive processor 238, a data sink 239, a controller/processor 240, a memory 242, a communication unit 244, and/or a scheduler 246, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor" or "a/the controller/processor," among other examples (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more MCSs for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use downlink control information (DCI) to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, and/or a memory 282, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may identify, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include an uplink control information (UCI) communication, a medium access control (MAC) control element (MAC-CE) communication, an RRC communication, or another type of uplink communication. Uplink signals may be transmitted on a physical uplink scheduled channel (PUSCH), a physical uplink control channel (PUCCH), and/or another type of uplink channel. An uplink signal may carry one or more transport blocks (TBs) of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range. The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal.

The network node 110, the controller/processor 240 of the network node 110, the UE 120, the controller/processor 280 of the UE 120, a CU, a DU, an RU, or any other component(s) of FIG. 1 or 2 may implement one or more techniques or perform one or more operations associated with clock calibration using sine waves, as described in more detail elsewhere herein. For example, the controller/processor 240 of the network node 110, the controller/processor 280 of the UE 120, any other component(s) of FIG. 2, the CU, the DU, or the RU may perform or direct operations of, for example, process 700 of FIG. 7, or other processes as described herein (alone or in conjunction with one or more other processors). The memory 242 may store data and program codes for the network node 110, the network node 110, the CU, the DU, or the RU. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU, the DU, or the RU, may cause the one or more processors to perform process 700 of FIG. 7, or other processes as described herein. In some examples, executing instructions may include running the instructions, converting the instructions, compiling the instructions, and/or interpreting the instructions, among other examples. In some aspects, the ambient IoT device 135 described herein is the UE 120, is included in the UE 120, or includes one or more components of the UE 120 shown in FIG. 2.

In some aspects, the ambient IoT device 135 includes means for receiving a mixed signal comprising multiple sine waves including a first sine wave having a first frequency and a second sine wave having a second frequency, the mixed signal comprising a reader-to-tag clock synchronization signal; and/or means for calibrating a clock that comprises a local oscillator of the ambient IoT device 135 using a difference between the first frequency and the second frequency. In some aspects, the means for the ambient IoT device 135 to perform operations described herein may include, for example, one or more of communication manager 138, antenna 252, modem 254, MIMO detector 256, receive processor 258, transmit processor 264, TX MIMO processor 266, controller/processor 280, or memory 282.

Figure 3:
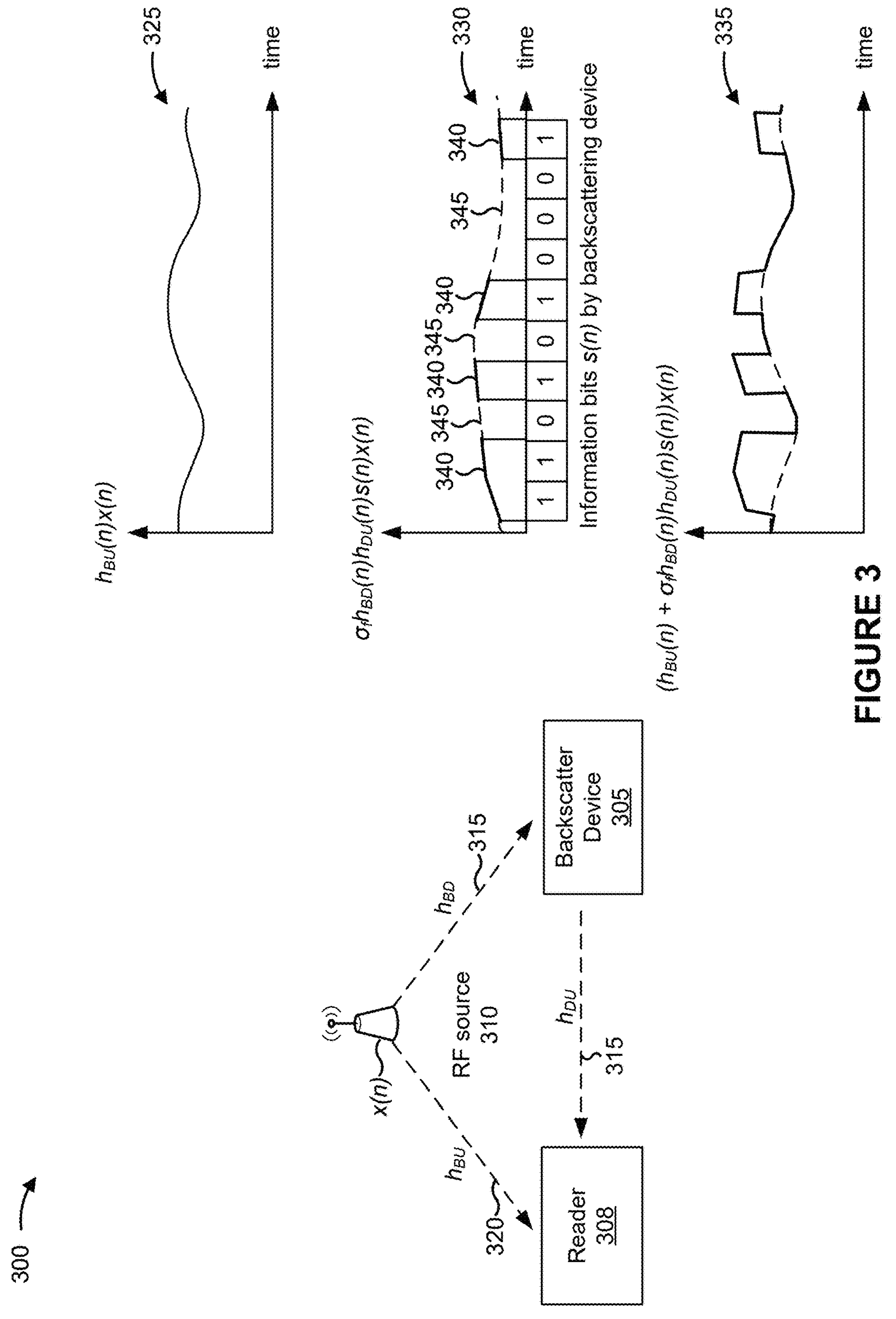
FIG. 3 is a diagram illustrating an example associated with backscatter communications.

FIG. 3 is a diagram illustrating an example 300 associated with backscatter communications.

Some wireless communication devices may be considered IoT devices, such as ambient IoT devices (sometimes referred to as ultra-light IoT devices), or similar IoT devices. In ambient IoT, a terminal (for example, an RFID device, a tag, or a similar device) may not include a battery, and the terminal may accumulate energy from radio signaling. To achieve further cost reduction and zero-power communication, wireless networks may utilize a type of ambient IoT device referred to as an "ambient backscatter device" or a "backscatter device."

As shown in FIG. 3, a backscatter device 305 (for example, a tag or a sensor, among other examples), which may be one example of an ambient IoT device, may employ a simplified hardware design (for example, including a power splitter, an energy harvester, and a microcontroller) that does not include a battery, such that the backscatter device 305 relies on energy harvesting for power, and that does not include a radio wave generation circuit, such that the backscatter device 305 is capable of transmitting information only by reflecting a radio wave. More particularly, the backscatter device 305 communicates with a reader 308 (for example, a UE 120, a network node 110, or another network device) by modulating a reflecting radio signal from a radio frequency (RF) source 310 (for example, a network node 110, a UE 120, or another network device). In some examples, the RF source 310 and the reader 308 may be the same device and/or may be co-located. For example, in some instances, the reader 308 and the RF source 310 may be associated with the same network node 110.

To facilitate communication of the backscatter device 305, the RF source 310 may transmit an energy harvesting wave to the backscatter device 305. The energy harvesting wave may be transmitted for a sufficient duration in order to enable a communication phase for a target range between the reader 308 and the backscatter device 305. Additionally or alternatively, in some instances, a range between the RF source 310 and the backscatter device 305 may be limited by a minimum received power for triggering energy harvesting at the backscatter device 305, such as −20 decibel milliwatts (dBm).

Once energy is sufficiently accumulated at the backscatter device 305, the backscatter device 305 may begin to reflect the radio wave that is radiated onto the backscatter device 305 via a backscatter link 315. For example, the RF source 310 may initiate a communication session (sometimes referred to as a query-response communication) with a query, which may be a modulating envelope of a carrier wave. The backscatter device 305 may respond by backscattering of the carrier wave. The communication session may include multiple rounds, such as for purposes of contention resolution when multiple backscatter devices respond to a query. A channel between the RF source 310 and the backscatter device 305 of the backscatter link 315 may be associated with a first backscatter link channel response value (sometimes referred to as a first backscatter link channel coefficient or a first backscatter link gain value), hBD. As described below, the backscatter device 305 may have reflection-on periods and reflection-off periods that follow a pattern that is based at least in part on the transmission of information bits by the backscatter device 305. The reader 308 may detect the reflection pattern of the backscatter device 305 and obtain the backscatter communication information via the backscatter link 315. A channel between the reader 308 and the backscatter device 305 of the backscatter link 315 may be associated with a second backscatter link channel response value (sometimes referred to as a second backscatter link channel coefficient or a second backscatter link channel gain value), hDU. In addition, the RF source 310 and the reader 308 may communicate (for example, reference signals and/or data signals) via a direct link 320. A channel between the RF source 310 and the reader 308 of the direct link 320 may be associated with a direct link channel response value (sometimes referred to as a direct link channel coefficient or a direct link channel gain value), hBU.

The backscatter device 305 may use an information modulation scheme, such as amplitude shift keying (ASK) modulation or on-off keying (OOK) modulation. For ASK or OOK modulation, the backscatter device 305 may switch on reflection when transmitting an information bit "1" and switch off reflection when transmitting an information bit "0." In backscatter communication, the RF source 310 may transmit a particular radio wave (for example, a reference signal or a data signal, such as a physical downlink shared channel (PDSCH)), which may be denoted as x(n). The reader 308 may receive this radio wave, x(n), directly from the RF source 310 via the direct link 320, as well as from the backscatter device 305 modulating and reflecting the radio wave to the reader 308 via the backscatter link 315. The signal received at the reader 308 via the direct link 320, indicated by reference number 325, is the product of the radio wave transmitted by the RF source 310, x(n), multiplied by the direct link channel response value, hBU, plus any signal noise. The information bits signal of the backscatter device 305 may be denoted as s(n) where $s(n) \in \{0,1\}$. Accordingly, the signal received at the reader 308 via the backscatter link 315, indicated by reference number 330, is the product of the signal transmitted by the RF source 310, x(n), multiplied by the first backscatter link channel response value, hBD, the second backscatter link channel response value, hDU, the information bits signal from the backscatter device 305, s(n), and a reflection coefficient associated with the backscatter device 305 plus any noise.

Thus, the resulting signal received at the reader 308, which is the superposition of the signal received via the direct link 320 and the signal received via the backscatter link 315, may be denoted as y(n). This signal, y(n), is shown by reference number 335. As shown, when s(n)=0 (indicated by reference number 340 in the plot shown at reference number 330), the backscatter device 305 may switch off reflection, and thus the reader 308 receives only the direct link 320 signal. When s(n)=1 (indicated by reference number 345 in the plot shown at reference number 330), the backscatter device 305 may switch on reflection, and thus the reader 308 receives a superposition of both the direct link 320 signal and the backscatter link 315 signal. To receive the information bits transmitted by the backscatter device 305, the reader 308 may first decode x(n) based at least in part on the direct link channel response value of h_BU (n) by treating the backscatter link 315 signal as interference. The reader 308 may then detect the existence of the signal component. In some instances, the backscatter device 305 may not maintain a state from communication session to communication session except of what is stored in the backscatter device 305 memory, such as an electronic product code (EPC) associated with backscatter device 305 or similar information.

Some ambient IoT devices, such as the backscatter device 305, are designed to operate without a battery, relying on energy harvesting for power. An ambient IoT device may be equipped with one or more oscillators (for example, instead of a crystal) that maintain a frequency of a local clock of the ambient IoT device. The oscillator(s) may consume less power than a crystal; however, the oscillator(s) may exhibit inaccuracies, such as frequency errors, jitter, or drift, among other examples. The extent of these inaccuracies can depend on the specific type of oscillator that is used by the ambient IoT device.

An inaccurate local clock may lead to discrepancies between the frequency of the local clock and a frequency of a remote clock (for example, a clock at a reader). For example, lack of sufficient clock synchronization may prevent the ambient IoT device from accurately identifying symbol boundaries in reader-to-device (for example, reader-to-ambient-IoT-device) communications. However, the local clock is subject to a tradeoff between accuracy and power consumption: the more accurate the local clock, the greater the power consumption and associated cost of the local clock.

For example, in device-to-reader (for example, ambient-IoT-device-to-reader) communications, device 1 and device 2*a* type ambient IoT devices (which may communicate uplink transmissions by backscattering externally-provided carrier waves) may perform a frequency shift for backscattered signals using a local clock on the order of 0.1 MHz and have a clock synchronization requirement of 1%. Device 2*b* type ambient IoT devices (which may communicate uplink transmissions by internally generating the uplink transmission) may use a transmit voltage-controlled oscillator (TX-VCO) to align with an uplink frequency and have a stricter clock synchronization requirement of 50 ppm.

Improving the accuracy of the local clock to satisfy such clock synchronization requirements can result in excessive power consumption. Accordingly, as described in greater detail below in connection with FIG. 4, ambient IoT devices (such as the backscatter device 305) may receive one or more clock synchronization signals from a reader and use the one or more clock synchronization signals to calibrate a local clock (for example, an oscillator).

Figure 4:
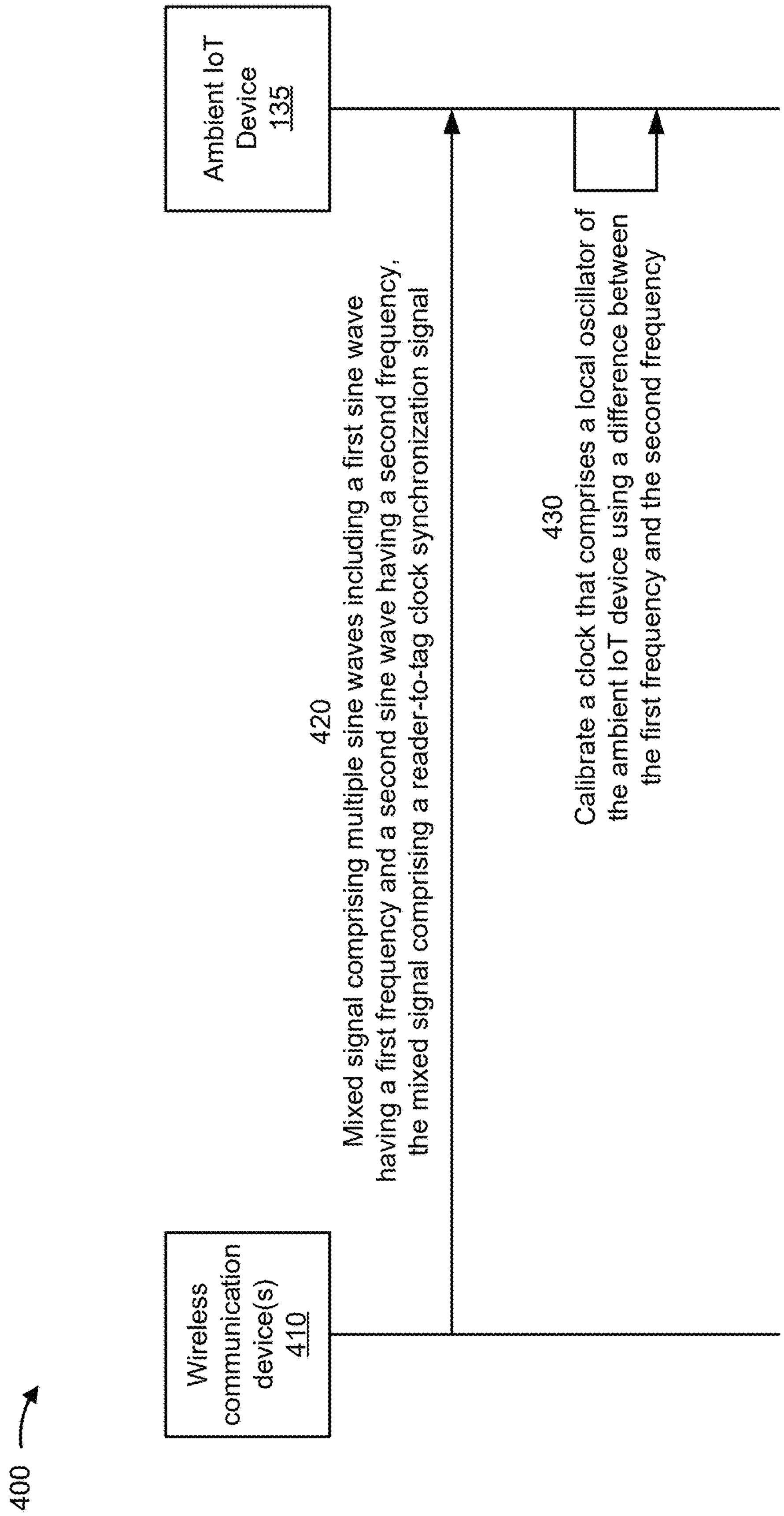
FIG. 4 is a diagram illustrating an example associated with ambient internet of things (IoT) clock synchronization.

FIG. 4 is a diagram illustrating an example 400 associated with ambient IoT clock synchronization. As shown in FIG. 4, one or more wireless communication devices 410 (for example, including a reader, such as a network node 110 or a UE 120) and an ambient IoT device 135 (for example, a backscatter device 305) may communicate with one another.

In a first operation 420, the wireless communication device(s) 410 may transmit, and the ambient IoT device 135 may receive, a mixed signal comprising multiple sine waves including a first sine wave having a first frequency and a second sine wave having a second frequency, the mixed signal comprising a reader-to-tag clock synchronization signal. For example, the mixed signal may be a superposition of the first sine wave and the second sine wave. In some examples, the first sine wave and the second sine wave may be dual-tone sine waves having different frequencies (for example, the first frequency may be different than the second frequency).

In a second operation 430, the ambient IoT device 135 may calibrate a clock that comprises a local oscillator of the ambient IoT device 135 using a difference between the first frequency and the second frequency. For example, the oscillator may be located at the ambient IoT device 135. In some examples, by calibrating the clock, the ambient IoT device 135 may synchronize the clock with a remote clock (for example, a clock at a reader, such as the wireless communication device(s) 410).

In some aspects, the ambient IoT device 135 may calibrate the clock by extracting, using envelope detection and low-pass filtering, an envelope of the mixed signal. For example, the ambient IoT device 135 may employ an envelope detector and a low-pass filter to extract the envelope. In some aspects, the envelope may have a frequency equal to the difference between the first frequency and the second frequency. For example, the envelope may approximate (for example, after the envelope detection and low-pass filtering) a sine wave with a frequency equal to the difference between the frequencies of the first and second sine waves.

Figure 5A:
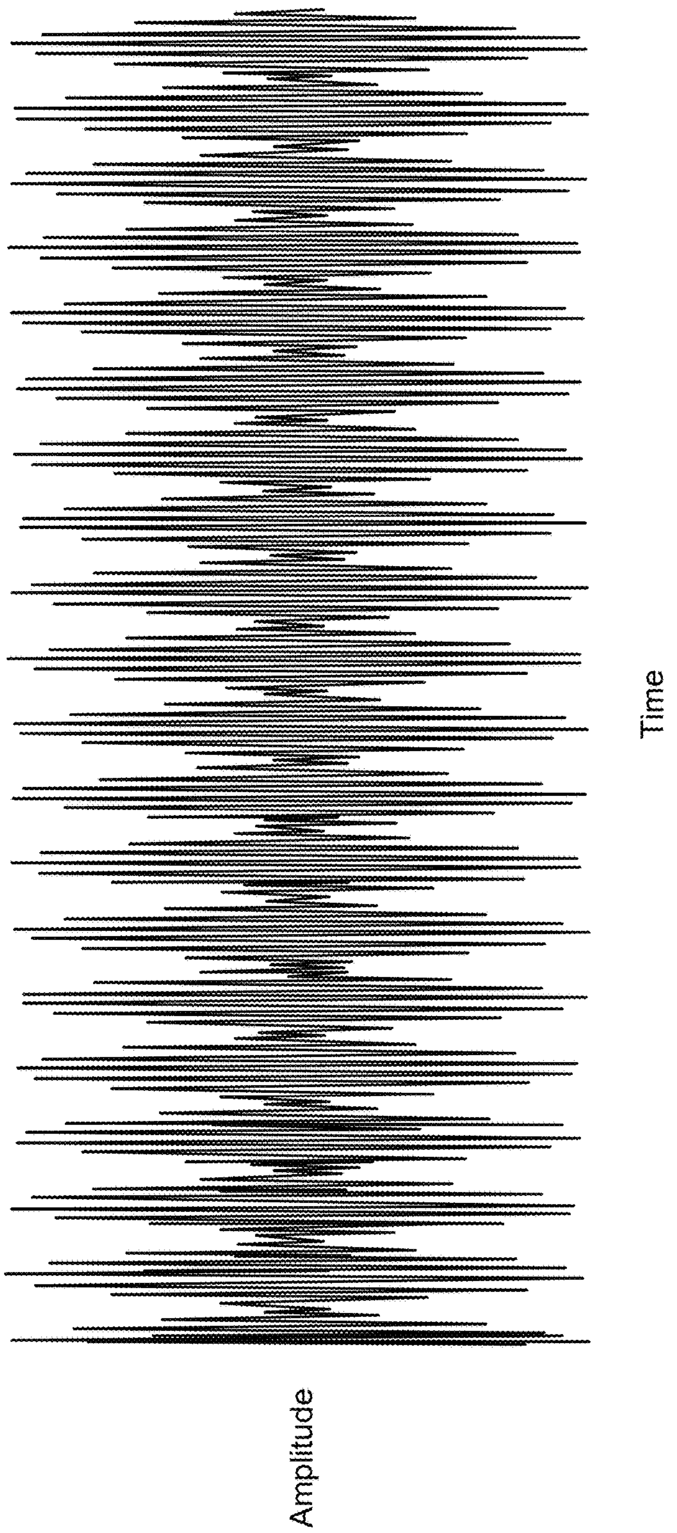
FIGS. 5A and 5B are diagrams illustrating examples associated with a mixed signal.
Figure 5B:
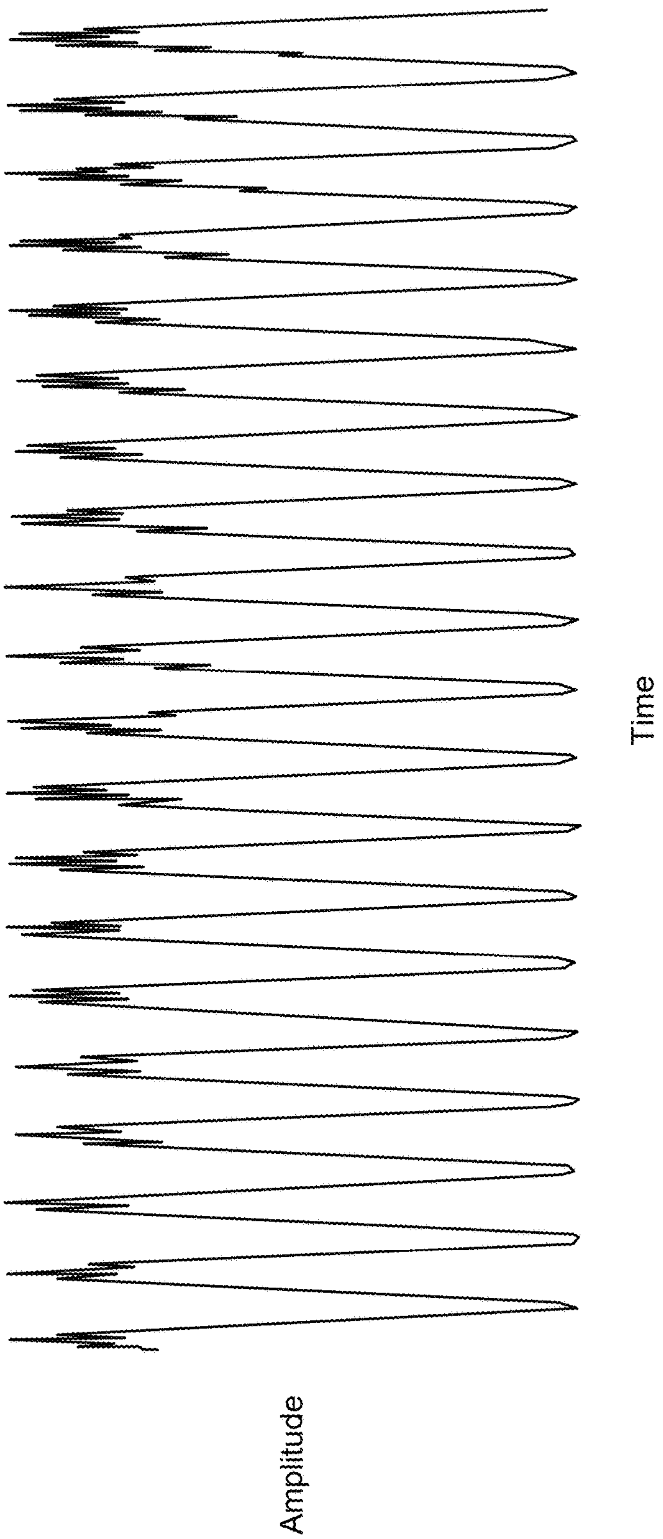

FIGS. 5A and 5B are diagrams illustrating examples 500A and 500B associated with the mixed signal.

With reference to FIG. 5A, example 500A shows an example of the mixed signal received by the ambient IoT device 135. The mixed signal may be a superposition of two sine waves, such as the first sine wave and the second sine wave.

With reference to FIG. 5B, example 500B shows an example of the envelope of the mixed signal. For example, the ambient IoT device 135 may use envelope detection and low-pass filtering to extract the envelope from the mixed signal shown in FIG. 5A.

Figure 6A:
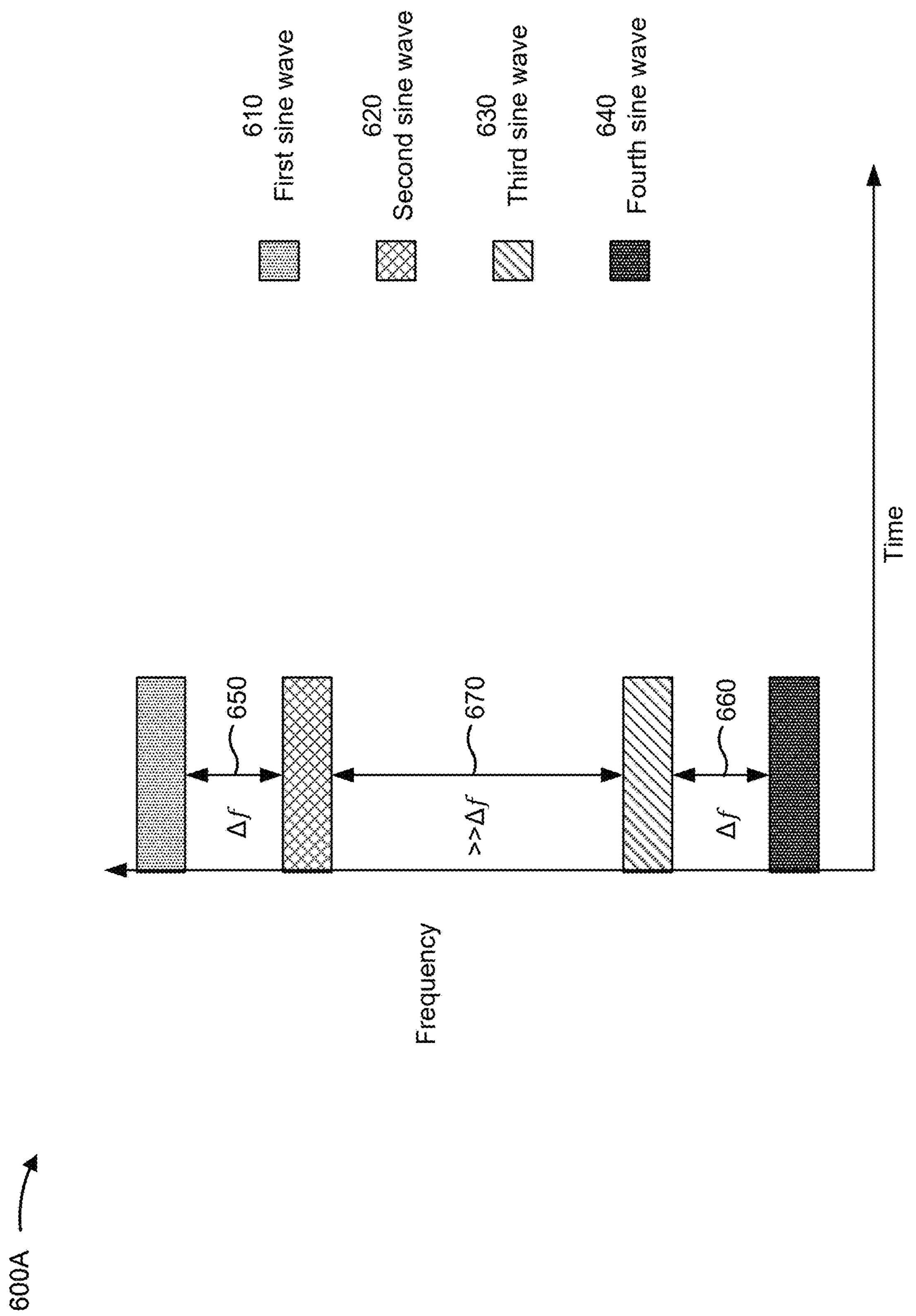
FIGS. 6A and 6B are diagrams illustrating examples associated with multiple pairs of dual-tone sine waves.
Figure 6B:
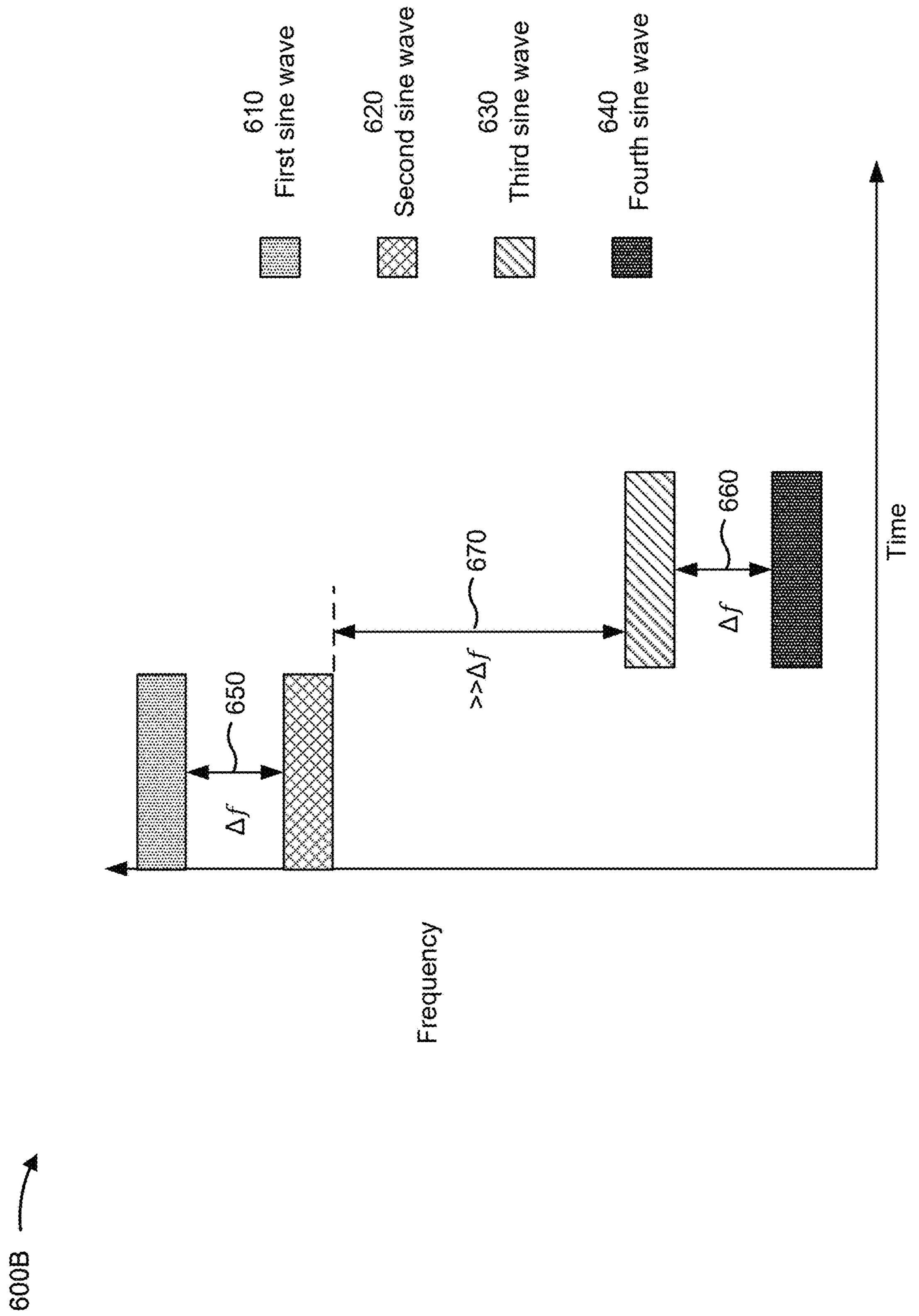

FIGS. 6A and 6B are diagrams illustrating examples 600A and 600B associated with multiple pairs of dual-tone sine waves.

In some aspects, the first sine wave (shown in FIGS. 6A and 6B as a first sine wave 610) and the second sine wave (shown in FIGS. 6A and 6B as a second sine wave 620) may comprise a first pair of dual-tone sine waves, and a second pair of dual-tone sine waves may include a third sine wave (shown in FIGS. 6A and 6B as a third sine wave 630) and a fourth sine wave (shown in FIGS. 6A and 6B as a fourth sine wave 640). For example, the third sine wave 630 may have a third frequency, and the fourth sine wave 640 may have a fourth frequency. The first frequency, the second frequency, the third frequency, and the fourth frequency may be different from each other. Thus, the wireless communication devices 410 may transmit a total of four tones to the ambient IoT device 135.

With reference to FIG. 6A, example 600A shows a first set of time and frequency resources corresponding to the first sine wave 610, the second sine wave 620, the third sine wave 630, and the fourth sine wave 640. In some aspects, the mixed signal may further comprise the second pair of dual-tone sine waves. For example, the first sine wave 610, the second sine wave 620, the third sine wave 630, and the fourth sine wave 640 may occupy the same time resources. Thus, the wireless communication device 410 may transmit the first sine wave 610, the second sine wave 620, the third sine wave 630, and the fourth sine wave 640 (and/or superpositions thereof) simultaneously, and the ambient IoT device 135 may receive the mixed signal that superposes the first sine wave 610, the second sine wave 620, the third sine wave 630, and the fourth sine wave 640.

With reference to FIG. 6B, example 600B shows a second set of time and frequency resources corresponding to the first sine wave 610, the second sine wave 620, the third sine wave 630, and the fourth sine wave 640. In some aspects, the mixed signal may be a first mixed signal, and the ambient IoT device 135 may receive the first mixed signal at a first time and a second mixed signal comprising the second pair of dual-tone sine waves at a second time that is different than the first time. For example, the wireless communication device(s) 410 may transmit, and the ambient IoT device 135 may receive, the first pair of dual-tone sine waves, comprising the first sine wave 610 and the second sine wave 620, at the first time. Subsequently, the wireless communication device(s) 410 may switch (for example, via frequency hopping) to sending the second pair of dual-tone sine waves, including the third sine wave 630 and the fourth sine wave 640, at the second time. In other examples, the first pair of dual-tone sine waves may occur in time after the second pair of dual-tone sine waves.

The following aspects may apply to one or more of examples 600A or 600B. In some aspects, the difference 650 between the first frequency and the second frequency may be equal to a difference 660 between the third frequency and the fourth frequency. For example, the difference 650 and the difference 660 may both be equal to Δf. The difference 650 may be a distance or spacing (for example, in frequency) between the first pair of dual-tone sine waves, and the difference 660 may be a distance or spacing (for example, in frequency) between the second pair of dual-tone sine waves. In some examples, the difference 650 and the difference 660 may remain constant.

In some aspects, the difference 650 between the first frequency and the second frequency may be less than a difference 670 between the second frequency and the third frequency. The difference 670 may be a distance or spacing (for example, in frequency) between the first pair of dual-tone sine waves and the second pair of dual-tone sine waves. In some examples, the spacing between the first pair of dual-tone sine waves and the second pair of dual-tone sine waves may be (much) larger than Δf (for example, >>Δf).

In some aspects, the ambient IoT device 135 may calibrate the clock using the second pair of dual-tone sine waves. For example, the ambient IoT device 135 may employ an envelope detector and a low-pass filter to extract an envelope of the mixed signal(s). For example, the envelope may approximate (for example, after the envelope detection and low-pass filtering) a sine wave with a frequency equal to Δf.

In some aspects, two or more of the first sine wave, the second sine wave, the third sine wave, or the fourth sine wave may be transmitted by a plurality of wireless communication devices 410. For example, the wireless communication device(s) 410 may comprise the plurality of (synchronized) wireless communication devices 410. In some examples, a first wireless communication device 410 may transmit the first pair of dual-tone sine waves, and a second wireless communication device 410 may transmit the second pair of dual-tone sine waves. In some examples, four wireless communication devices 410 may transmit respective sine waves 610-640 (at the first through fourth frequencies, respectively). In other examples, the wireless communication device(s) 410 may be a single wireless communication device 410 that transmits each of the sine waves 610-640 (at the first through fourth frequencies, respectively), two or more of which may be superposed with each other.

In some aspects, the ambient IoT device 135 may transmit, responsive to calibrating the clock, a device-to-reader signal by backscattering one or more of the first pair of dual-tone sine waves or the second pair of dual-tone sine waves. For example, the ambient IoT device 135 may calibrate the clock using the first pair of dual-tone sine waves and/or the second pair of dual-tone sine waves, as described above. The ambient IoT device 135 may then backscatter the first pair of dual-tone sine waves and/or the second pair of dual-tone sine waves. Thus, in some examples, the first pair of dual-tone sine waves and/or the second pair of dual-tone sine waves may serve as dual-tone continuous waveform(s) that the ambient IoT device 135 can use for backscattering. The device-to-reader signal may be received by one or more of the wireless communication devices 410 or another wireless communication device (for example, a reader).

Additionally or alternatively to other aspects described herein, in some aspects, a wireless communication device (for example, the wireless communication device 410) may transmit, and an ambient IoT device (for example, the ambient IoT device 135) may receive, a single sine wave (for example, a pure sine wave). The single sine wave may be a clock synchronization signal. In some aspects, the ambient IoT device may calibrate the clock using one or more clock cycles of the single sine wave. For example, the ambient IoT device may count the clock cycles of the single sine wave and use the clock cycles to tune the clock (for example, a local oscillator).

Calibrating the clock using the difference between the first frequency and the second frequency may help to enhance clock synchronization and communication reliability in wireless systems without consuming excessive power. For example, using the multiple sine waves may offer enhanced reliability while enabling the ambient IoT device 135 to use low-power techniques for performing the clock synchronization, such as envelope detection or low-pass filtering.

Calibrating the clock using the second pair of dual-tone sine waves may help to enhance resilience to deep fading. Receiving the first mixed signal at the first time and the second mixed signal at the second time may help to further enhance resilience to deep fading. The plurality of wireless transmission devices 410 transmitting two or more of the first sine wave, the second sine wave, the third sine wave, or the fourth sine wave may help to reduce peak-to-average power ratios (PAPRs).

Calibrating the clock using one or more clock cycles of the single sine wave may involve low-complexity signal processing and, thus, further reduce power consumption.

Figure 7:
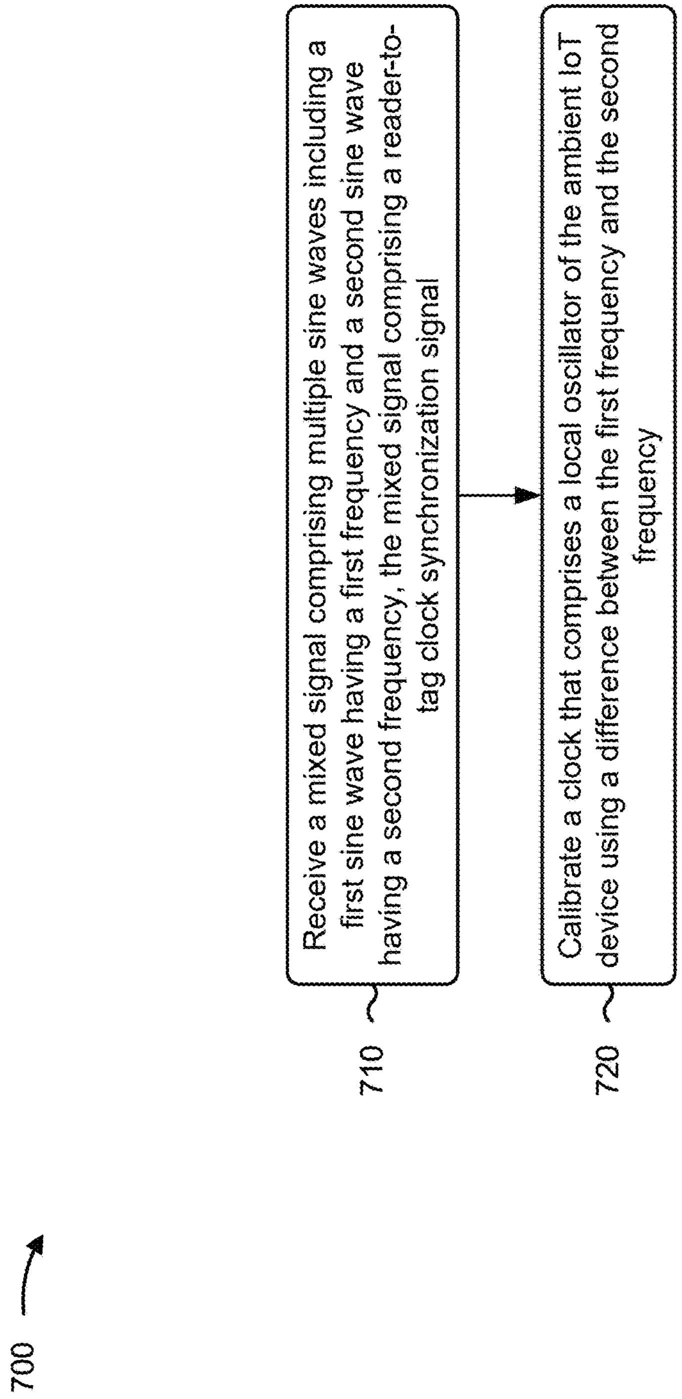
FIG. 7 is a flowchart illustrating an example process performed, for example, at an ambient IoT device or an apparatus of an ambient IoT device that supports clock calibration using sine waves.

FIG. 7 is a flowchart illustrating an example process 700 performed, for example, at an ambient IoT device or an apparatus of an ambient IoT device that supports clock calibration using sine waves. Example process 700 is an example where the apparatus or the ambient IoT device (for example, ambient IoT device 135) performs operations associated with clock calibration using sine waves.

As shown in FIG. 7, in some aspects, process 700 may include receiving a mixed signal comprising multiple sine waves including a first sine wave having a first frequency and a second sine wave having a second frequency, the mixed signal comprising a reader-to-tag clock synchronization signal (block 710). For example, the ambient IoT device (such as by using communication manager 138 or reception component 802, depicted in FIG. 8) may receive a mixed signal comprising multiple sine waves including a first sine wave having a first frequency and a second sine wave having a second frequency, the mixed signal comprising a reader-to-tag clock synchronization signal, as described above.

As further shown in FIG. 7, in some aspects, process 700 may include calibrating a clock that comprises a local oscillator of the ambient IoT device using a difference between the first frequency and the second frequency (block 720). For example, the ambient IoT device (such as by using communication manager 138 or calibration component 808, depicted in FIG. 8) may calibrate a clock that comprises a local oscillator of the ambient IoT device using a difference between the first frequency and the second frequency, as described above.

Process 700 may include additional aspects, such as any single aspect or any combination of aspects described below or in connection with one or more other processes described elsewhere herein.

In a first additional aspect, calibrating the clock includes extracting, using envelope detection and low-pass filtering, an envelope of the mixed signal, the envelope having a frequency equal to the difference between the first frequency and the second frequency.

In a second additional aspect, alone or in combination with the first aspect, the first sine wave and the second sine wave comprise a first pair of dual-tone sine waves, and calibrating the clock includes calibrating the clock using a second pair of dual-tone sine waves including a third sine wave having a third frequency and a fourth sine wave having a fourth frequency.

In a third additional aspect, alone or in combination with one or more of the first and second aspects, a difference between the third frequency and the fourth frequency is equal to the difference between the first frequency and the second frequency.

In a fourth additional aspect, alone or in combination with one or more of the first through third aspects, the difference between the first frequency and the second frequency is less than a difference between the second frequency and the third frequency.

In a fifth additional aspect, alone or in combination with one or more of the first through fourth aspects, the mixed signal further comprises the second pair of dual-tone sine waves.

In a sixth additional aspect, alone or in combination with one or more of the first through fifth aspects, the mixed signal is a first mixed signal, receiving the first mixed signal includes receiving the first mixed signal at a first time, and process 700 includes receiving a second mixed signal comprising the second pair of dual-tone sine waves at a second time that is different than the first time.

In a seventh additional aspect, alone or in combination with one or more of the first through sixth aspects, two or more of the first sine wave, the second sine wave, the third sine wave, or the fourth sine wave are transmitted by a plurality of wireless communication devices.

In an eighth additional aspect, alone or in combination with one or more of the first through seventh aspects, process 700 includes transmitting, responsive to calibrating the clock, a device-to-reader signal by backscattering one or more of the first pair of dual-tone sine waves or the second pair of dual-tone sine waves.

In a ninth additional aspect, alone or in combination with one or more of the first through eighth aspects, process 700 includes receiving a single sine wave, and calibrating the clock using one or more clock cycles of the single sine wave.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
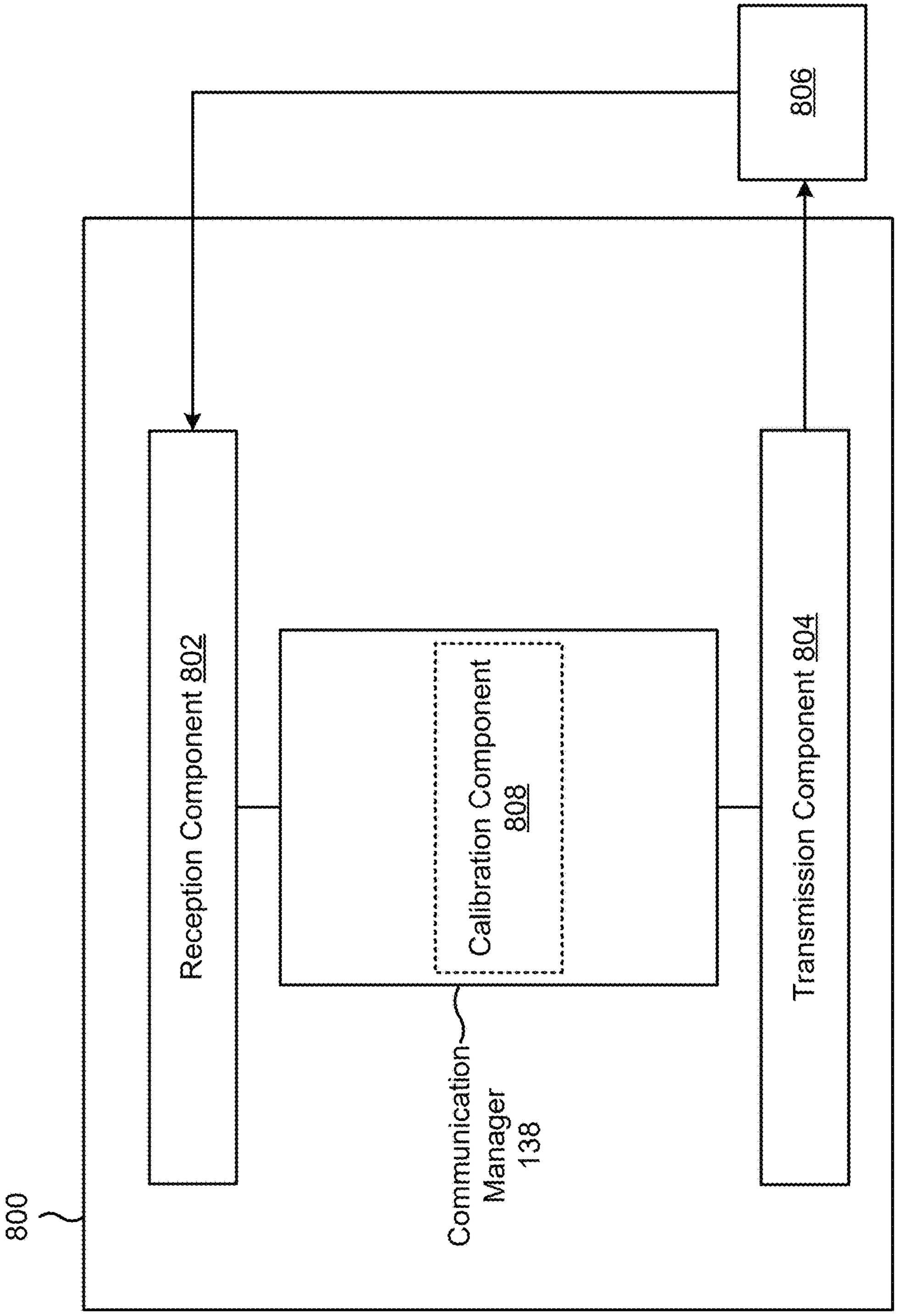
FIG. 8 is a diagram of an example apparatus for wireless communication that supports clock calibration using sine waves.

FIG. 8 is a diagram of an example apparatus 800 for wireless communication that supports clock calibration using sine waves. The apparatus 800 may be a ambient IoT device, or a ambient IoT device may include the apparatus 800. In some aspects, the apparatus 800 includes a reception component 802, a transmission component 804, and a communication manager 138, which may be in communication with one another (for example, via one or more buses). As shown, the apparatus 800 may communicate with another apparatus 806 (such as a UE, a network node, or another wireless communication device) using the reception component 802 and the transmission component 804.

In some aspects, the apparatus 800 may be configured to and/or operable to perform one or more operations described herein in connection with FIGS. 4-6B. Additionally or alternatively, the apparatus 800 may be configured to and/or operable to perform one or more processes described herein, such as process 700 of FIG. 7. In some aspects, the apparatus 800 may include one or more components of the ambient IoT device described above in connection with FIG. 2.

The reception component 802 may receive communications, such as reference signals, control information, and/or data communications, from the apparatus 806. The reception component 802 may provide received communications to one or more other components of the apparatus 800, such as the communication manager 138. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, one or more modems, one or more demodulators, one or more MIMO detectors, one or more receive processors, one or more controllers/processors, and/or one or more memories of the ambient IoT device described above in connection with FIG. 2.

The transmission component 804 may transmit communications, such as reference signals, control information, and/or data communications, to the apparatus 806. In some aspects, the communication manager 138 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, one or more modems, one or more modulators, one or more transmit MIMO processors, one or more transmit processors, one or more controllers/processors, and/or one or more memories of the ambient IoT device described above in connection with FIG. 2. In some aspects, the transmission component 804 may be co-located with the reception component 802 in one or more transceivers.

The communication manager 138 may receive or may cause the reception component 802 to receive a mixed signal comprising multiple sine waves including a first sine wave having a first frequency and a second sine wave having a second frequency, the mixed signal comprising a reader-to-tag clock synchronization signal. The communication manager 138 may calibrate a clock that comprises a local oscillator of the ambient IoT device using a difference between the first frequency and the second frequency. In some aspects, the communication manager 138 may perform one or more operations described elsewhere herein as being performed by one or more components of the communication manager 138.

The communication manager 138 may include one or more controllers/processors and/or one or more memories of the ambient IoT device described above in connection with FIG. 2. In some aspects, the communication manager 138 includes a set of components, such as a calibration component 808. Alternatively, the set of components may be separate and distinct from the communication manager 138. In some aspects, one or more components of the set of components may include or may be implemented within one or more controllers/processors and/or one or more memories of the ambient IoT device described above in connection with FIG. 2. Additionally or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

In some aspects, the reception component 802 may receive a mixed signal comprising multiple sine waves including a first sine wave having a first frequency and a second sine wave having a second frequency, the mixed signal comprising a reader-to-tag clock synchronization signal. In some aspects, the calibration component 808 may calibrate a clock that comprises a local oscillator of the ambient IoT device using a difference between the first frequency and the second frequency. In some aspects, the transmission component 804 may transmit, responsive to calibrating the clock, a device-to-reader signal by backscattering one or more of the first pair of dual-tone sine waves or the second pair of dual-tone sine waves. In some aspects, the reception component 802 may receive a single sine wave. In some aspects, the calibration component 808 may calibrate the clock using one or more clock cycles of the single sine wave.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed at an ambient internet of things (IoT) device, comprising: receiving a mixed signal comprising multiple sine waves including a first sine wave having a first frequency and a second sine wave having a second frequency, the mixed signal comprising a reader-to-tag clock synchronization signal; and calibrating a clock that comprises a local oscillator of the ambient IoT device using a difference between the first frequency and the second frequency.

Aspect 2: The method of Aspect 1, wherein calibrating the clock includes extracting, using envelope detection and low-pass filtering, an envelope of the mixed signal, the envelope having a frequency equal to the difference between the first frequency and the second frequency.

Aspect 3: The method of any of Aspects 1-2, wherein the first sine wave and the second sine wave comprise a first pair of dual-tone sine waves, and wherein calibrating the clock includes calibrating the clock using a second pair of dual-tone sine waves including a third sine wave having a third frequency and a fourth sine wave having a fourth frequency.

Aspect 4: The method of Aspect 3, wherein a difference between the third frequency and the fourth frequency is equal to the difference between the first frequency and the second frequency.

Aspect 5: The method of Aspect 3, wherein the difference between the first frequency and the second frequency is less than a difference between the second frequency and the third frequency.

Aspect 6: The method of Aspect 3, wherein the mixed signal further comprises the second pair of dual-tone sine waves.

Aspect 7: The method of Aspect 3, wherein the mixed signal is a first mixed signal, and wherein receiving the first mixed signal includes receiving the first mixed signal at a first time, the method further comprising: receiving a second mixed signal comprising the second pair of dual-tone sine waves at a second time that is different than the first time.

Aspect 8: The method of Aspect 3, wherein two or more of the first sine wave, the second sine wave, the third sine wave, or the fourth sine wave are transmitted by a plurality of wireless communication devices.

Aspect 9: The method of Aspect 3, further comprising: transmitting, responsive to calibrating the clock, a device-to-reader signal by backscattering one or more of the first pair of dual-tone sine waves or the second pair of dual-tone sine waves.

Aspect 10: The method of any of Aspects 1-9, further comprising: receiving a single sine wave; and calibrating the clock using one or more clock cycles of the single sine wave.

Aspect 11: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-10.

Aspect 12: An apparatus for wireless communication at a device, the apparatus comprising one or more memories and one or more processors coupled to the one or more memories, the one or more processors configured to cause the device to perform the method of one or more of Aspects 1-10.

Aspect 13: An apparatus for wireless communication, the apparatus comprising at least one means for performing the method of one or more of Aspects 1-10.

Aspect 14: A non-transitory computer-readable medium storing code for wireless communication, the code comprising instructions executable by one or more processors to perform the method of one or more of Aspects 1-10.

Aspect 15: A non-transitory computer-readable medium storing a set of instructions for wireless communication, the set of instructions comprising one or more instructions that, when executed by one or more processors of a device, cause the device to perform the method of one or more of Aspects 1-10.

Aspect 16: A device for wireless communication, the device comprising a processing system that includes one or more processors and one or more memories coupled with the one or more processors, the processing system configured to cause the device to perform the method of one or more of Aspects 1-10.

Aspect 17: An apparatus for wireless communication at a device, the apparatus comprising one or more memories and one or more processors coupled to the one or more memories, the one or more processors individually or collectively configured to cause the device to perform the method of one or more of Aspects 1-10.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware or a combination of hardware and at least one of software or firmware. “Software” shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a “processor” is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, “satisfying a threshold” may, depending on the context, refer to a value being greater than the threshold, greater than or equal to the threshold, less than the threshold, less than or equal to the threshold, equal to the threshold, or not equal to the threshold, among other examples.

As used herein, the term “determine” or “determining” encompasses a wide variety of actions and, therefore, “determining” can include calculating, computing, processing, deriving, investigating, looking up (such as via looking up in a table, a database or another data structure), identifying, inferring, ascertaining, measuring, and the like. Also, “determining” can include receiving (such as receiving information or receiving an indication), accessing (such as accessing data stored in memory), transmitting (such as transmitting information) and the like. Also, “determining” can include resolving, selecting, obtaining, choosing, establishing and other such similar actions. The term “identify” or “identifying” also encompasses a wide variety of actions and, therefore, “identifying” can include calculating, computing, processing, deriving, investigating, looking up (such as via looking up in a table, a database or another data structure), inferring, ascertaining, measuring, and the like. Also, “identifying” can include receiving (such as receiving information or receiving an indication), accessing (such as accessing data stored in memory), transmitting (such as transmitting information) and the like. Also, “identifying” can include resolving, selecting, obtaining, choosing, establishing and other such similar actions.

As used herein, a phrase referring to “at least one of” a list of items refers to any combination of those items, including single members. As an example, “at least one of: a, b, or c” is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, as used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An ambient internet of things (IoT) device, comprising:
- one or more antennas; and
- a processing system that includes one or more processors and one or more memories that store code for the one or more processors, the processing system configured to cause the ambient IoT device to:
  - receive a mixed signal comprising multiple sine waves including a first sine wave having a first frequency and a second sine wave having a second frequency, the mixed signal comprising a reader-to-tag clock synchronization signal, and the first sine wave and the second sine wave being a first pair of dual-tone sine waves; and
  - calibrate a clock that comprises a local oscillator of the ambient IoT device using:
    - a difference between the first frequency of the first sine wave, included in the mixed signal, and the second frequency of the second sine wave, included in the mixed signal, and
    - a second pair of dual-tone sine waves including a third sine wave having a third frequency and a fourth sine wave having a fourth frequency.

2. The ambient IoT device of claim 1, wherein the processing system, to cause the ambient IoT device to calibrate the clock, is configured to cause the ambient IoT device to extract, using envelope detection and low-pass filtering, an envelope of the mixed signal, the envelope having a frequency equal to the difference between the first frequency and the second frequency.

3. The ambient IoT device of claim 1, wherein a difference between the third frequency and the fourth frequency is equal to the difference between the first frequency and the second frequency.

4. The ambient IoT device of claim 1, wherein the difference between the first frequency and the second frequency is less than a difference between the second frequency and the third frequency.

5. The ambient IoT device of claim 1, wherein the mixed signal further comprises the second pair of dual-tone sine waves.

6. The ambient IoT device of claim 1, wherein the mixed signal is a first mixed signal, wherein the processing system, to receive the first mixed signal, is configured to cause the ambient IoT device to receive the first mixed signal at a first time, and wherein the processing system is further configured to cause the ambient IoT device to:
- receive a second mixed signal comprising the second pair of dual-tone sine waves at a second time that is different than the first time.

7. The ambient IoT device of claim 1, wherein two or more of the first sine wave, the second sine wave, the third sine wave, or the fourth sine wave are from a plurality of wireless communication devices.

8. The ambient IoT device of claim 1, wherein the processing system is further configured to cause the ambient IoT device to:
- backscatter, responsive to calibration of the clock, one or more of the first pair of dual-tone sine waves or the second pair of dual-tone sine waves to transmit a device-to-reader signal.

9. The ambient IoT device of claim 1, wherein the processing system is further configured to cause the ambient IoT device to:
- receive a single sine wave; and
- calibrate the clock using one or more clock cycles of the single sine wave.

10. A method of wireless communication performed at an ambient internet of things (IoT) device, comprising:
- receiving a mixed signal comprising multiple sine waves including a first sine wave having a first frequency and a second sine wave having a second frequency, the mixed signal comprising a reader-to-tag clock synchronization signal, and the first sine wave and the second sine wave being a first pair of dual-tone sine waves; and
- calibrating a clock that comprises a local oscillator of the ambient IoT device using:
  - a difference between the first frequency of the first sine wave, included in the mixed signal, and the second frequency of the second sine wave, included in the mixed signal, and
  - a second pair of dual-tone sine waves including a third sine wave having a third frequency and a fourth sine wave having a fourth frequency.

11. The method of claim 10, wherein a difference between the third frequency and the fourth frequency is equal to the difference between the first frequency and the second frequency.

12. The method of claim 10, wherein the difference between the first frequency and the second frequency is less than a difference between the second frequency and the third frequency.

13. The method of claim 10, wherein the mixed signal further comprises the second pair of dual-tone sine waves.

14. The method of claim 10, wherein the mixed signal is a first mixed signal, wherein receiving the first mixed signal includes receiving the first mixed signal at a first time, and wherein the method further comprises:

receiving a second mixed signal comprising the second pair of dual-tone sine waves at a second time that is different than the first time.

15. The method of claim 10, wherein two or more of the first sine wave, the second sine wave, the third sine wave, or the fourth sine wave are received from a plurality of wireless communication devices.

16. The method of claim 10, further comprising:

transmitting, responsive to calibrating the clock, a device-to-reader signal by backscattering one or more of the first pair of dual-tone sine waves or the second pair of dual-tone sine waves.

17. The method of claim 10, further comprising:

receiving a single sine wave; and calibrating the clock using one or more clock cycles of the single sine wave.

18. The method of claim 10, wherein calibrating the clock comprises:

extracting, using envelope detection and low-pass filtering, an envelope of the mixed signal, the envelope having a frequency equal to the difference between the first frequency and the second frequency.

19. The method of claim 10, wherein the first pair of dual-tone sine waves is received from a first device and the second pair of dual-tone sine waves is received from a second device.

20. An apparatus for wireless communication, comprising:

means for receiving a mixed signal comprising multiple sine waves including a first sine wave having a first frequency and a second sine wave having a second frequency, the mixed signal comprising a reader-to-tag clock synchronization signal, and the first sine wave and the second sine wave being a first pair of dual-tone sine waves; and means for calibrating a clock that comprises a local oscillator of the apparatus using;

a difference between the first frequency of the first sine wave, included in the mixed signal, and the second frequency of the second sine wave, included in the mixed signal, and a second pair of dual-tone sine waves including a third sine wave having a third frequency and a fourth sine wave having a fourth frequency.

* * * * *